United States Patent [19]

Spitz

[11] 3,906,196

[45] Sept. 16, 1975

[54] NON-LINEAR FEEDBACK CONTROLLER

[75] Inventor: David Allan Spitz, Columbus, Ohio

[73] Assignee: Industrial Nucleonics Corporation, Columbus, Ohio

[22] Filed: Oct. 17, 1973

[21] Appl. No.: 407,166

[52] U.S. Cl. .................. 235/150.1; 318/619; 34/43
[51] Int. Cl.² ......................................... G05B 11/01
[58] Field of Search .................. 235/150.1; 318/619

[56] References Cited
UNITED STATES PATENTS

| | | | |
|---|---|---|---|
| 2,760,131 | 8/1956 | Braunagel | 318/619 |
| 3,644,720 | 10/1969 | Falk | 235/150.1 |
| 3,777,122 | 12/1973 | Borsboom | 235/150.1 |
| 3,794,817 | 2/1974 | Shinskey | 235/150.1 |

*Primary Examiner*—Eugene G. Botz
*Attorney, Agent, or Firm*—W. T. Fryer, III; C. Henry Peterson; Allan M. Lowe

[57] ABSTRACT

A feedback system provides control for an actuator in a range of error signals wherein deadband is otherwise frequently provided to reduce noise content of a parameter controlled by the actuator. A signal indicative of the magnitude of the controlled parameter is compared with a setpoint for the controlled parameter to derive an error signal having a magnitude and polarity equal to the difference between the parameter and the setpoint. For error signals within assigned limits, a control signal for the actuator is derived by feeding the error signal to a network which generates an output signal having a magnitude directly proportional to the square of the error signal and a polarity that is the same as the polarity of the error signal. For error signals beyond assigned limits for the error signal, the control signal is linearly related to the error signal.

4 Claims, 3 Drawing Figures

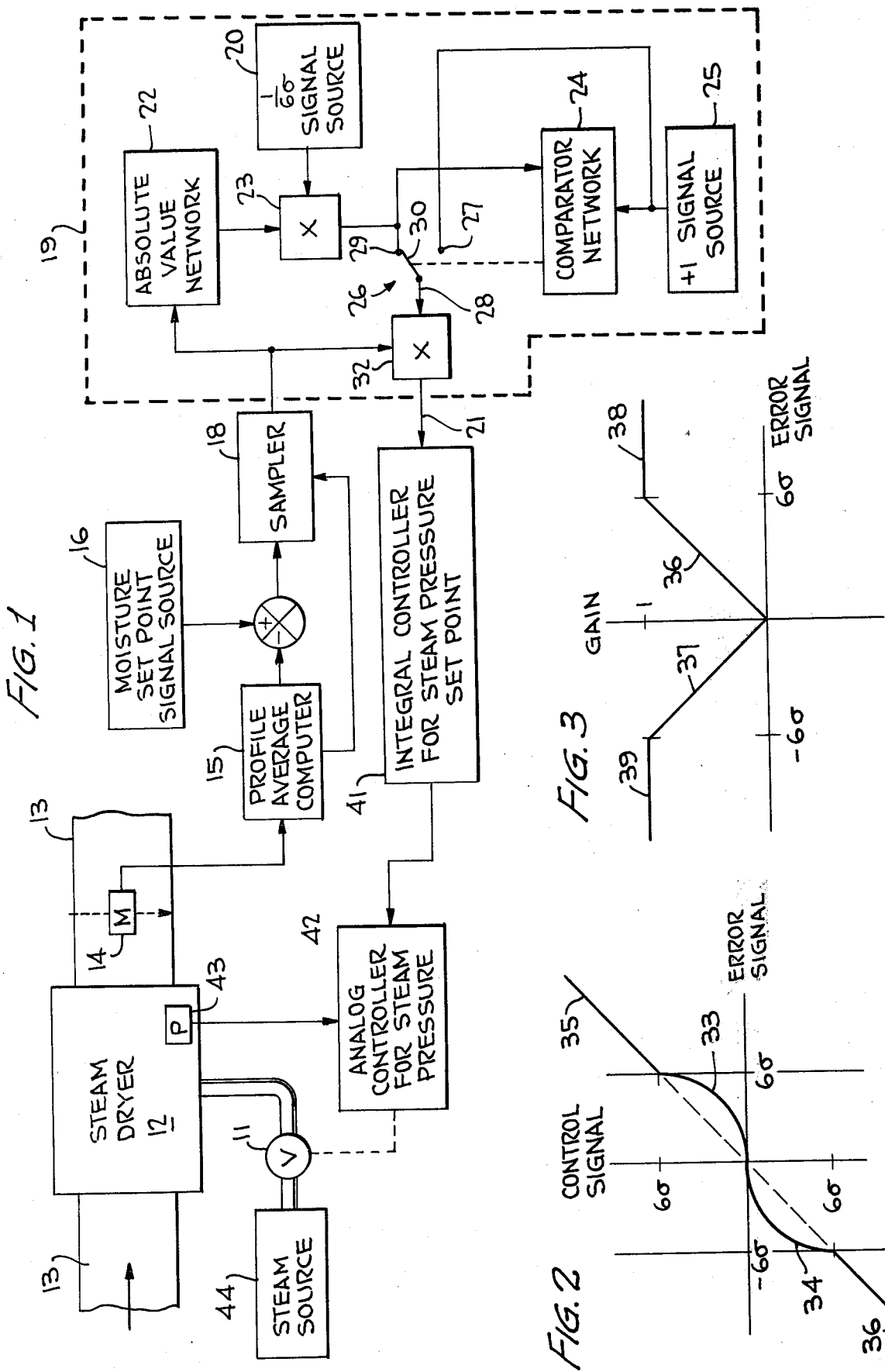

NON-LINEAR FEEDBACK CONTROLLER

FIELD OF THE INVENTION

The present invention relates generally to sampling or digital feedback controllers and, more particularly, to a feedback controller wherein noise is reduced by deriving a control signal that is a nonlinear function of the error signal magnitude.

BACKGROUND OF THE INVENTION

One type of conventional sampling or digital linear feedback controller includes means for deriving an error signal in response to a comparison of a signal indicative of an output quantity and a setpoint magnitude for the quantity. In response to the error signal magnitude and polarity, a feedback signal for an actuator controlling the output quantity is derived. The control signal magnitude is linearly related to the error signal value by a multiplication factor determined by the gain of the feedback loop. The feedback loop effectively controls the average value of the output quantity to the setpoint. However, for large gain magnitudes, this type of controller causes a significant increase in random variations, i.e., noise, in the output quantity compared to the amount of noise that would occur if no feedback control had been provided. Noise, in the present case, is defined as random variations that cannot be corrected by the feedback controller.

To reduce noise, sampling or digital linear feedback controllers have been modified to include a deadband. In deadband feedback controllers, no control is provided in a relatively narrow range of error signals wherein the output quantity deviates by a small amount from the setpoint. Thereby, the output quantity does not have a tendency to be unstable or oscillate about the setpoint value with a resulting decrease in the magnitude of the random variations. However, no control of the output quantity can be provided in the deadband region and this can result in fairly substantial uncorrectable errors in the output quantity. These uncorrectable errors significantly retard the response of deadband feedback controllers since the actuator is not driven until the error magnitude exceeds the deadband.

BRIEF DESCRIPTION OF THE INVENTION

In accordance with the present invention, an improved sampling or digital feedback controller is provided wherein the noted disadvantages of the linear and deadband controllers are substantially avoided. The result is achieved by including a nonlinear device responsive to the error signal. The nonlinear device has a gain proportional to the error signal magnitude and is operative within assigned limits of the error signal. Outside of the assigned limits, the nonlinear, variable gain is effectively replaced by a fixed gain. Hence, within the assigned limits region, nonlinear control is provided, but the amount of control is less than is obtained in a linear feedback controller so that the tendency of the controller to cause oscillation and therefore increase random variations of the output quantity is reduced relative to a linear feedback controller. Since control between the assigned limits region is continuous, rather than discontinuous as in a true deadband controller, the response is considerably better than that of true deadband controllers.

In a particular embodiment of the invention, the absolute value of the error signal is derived and multiplied by a constant related to the standard deviation of the output quantity; the value of the standard deviation can be determined on a predetermined basis from known statistical properties of the output quantity. A good value for the constant (assuming Gaussian or white noise) is approximately $1/6\sigma$ (where $\sigma$ = the standard deviation of the output quantity) to provide an effective compromise between transient response and noise reduction. If the constant is less than $1/6\sigma$, the system transient response is retarded, while for values of the constant greater than $1/6\sigma$ there is an increase in the amount of noise in the output quantity. To provide the nonlinear control, the absolute value signal, as modified by the constant, is multiplied by the error signal to derive a control signal having a magnitude equal to the square of the error signal multiplied by the constant and a polarity determined by the polarity of the error signal. Because of the square law relationship between the control signal and the error signal magnitude, the control signal magnitude is less than the error signal magnitude over the region of error signals within a region wherein the absolute magnitude of the error signal is less than $6\sigma$. Therefore, the nonlinear type operation is obtained in the present invention in the region wherein the absolute magnitude of the error signal is less than $6\sigma$. For values of the error signal greater than $6\sigma$, linear operation is obtained.

It is accordingly, an object of the present invention to provide a new and improved sampling or digital nonlinear, feedback controller.

Another object of the invention is to provide a new and improved sampling or digital feedback system for providing control of an actuator in a range of error signals wherein deadband is otherwise frequently provided to alleviate the effects of noise produced by a proportional feedback controller.

A further object of the invention is to provide a new and improved sampling or digital system wherein offset due to deadband is substantially alleviated without substantially increasing random, uncorrectable variations relative to the magnitude of the variations without feedback and control.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 1 is a block diagram of one preferred embodiment of the invention;

FIG. 2 is a plot of control signal variations versus error signal variations of the system illustrated in FIG. 1; and FIG. 3 is a diagram illustrating gain versus error signal magnitude of the system of FIG. 1.

DETAILED DESCRIPTION OF THE DRAWING

The system specifically illustrated in FIG. 1 involves control of a steam valve 11 of a dryer 12 included in a paper-making machine. It is to be understood however, that the principles of the invention are equally applicable to control of any suitable actuator and the invention is not limited to the specific system described and illustrated. Dryer 12 is of a conventional type, and removes moisture from sheet 13 that travels longitudinally through the dryer. Downstream of dryer 12 is a scanning moisture gauge 14 that periodically, such as once every minute, scans between the sheet edges. As gauge 14 scans across sheet 13, the gauge derives an electric output signal indicative of the moisture of the sheet along a diagonal region. The signal derived from gauge 14 is supplied to a conventional profile average computer 15 which, upon completion of a scan of gauge 14, derives an output signal having a magnitude equal to the average value of the sheet moisture as detected by gauge 14 over its last scan. The output signal of profile averaging computer 15 is maintained constant between scans of gauge 14, until the next scan of the gauge has been completed.

The output signal of profile averaging computer 15 is compared with a moisture setpoint signal derived from source 16. The comparison of the output signals of computer 15 and source 16 is performed by subtraction network 17, which derives an error signal indicative of the difference between the average moisture value for a scan of gauge 14 across sheet 13 relative to the moisture setpoint derived from source 16. The error signal magnitude derived from difference network 17 is supplied to sampler 18 which derives an output signal for a relatively short time after each scan of gauge 14 has been completed in response to a sample command signal being fed to the sampler by computer 15; the sample command signal is supplied to sample in response to the computer completing a computation after each scan. Sampler 18 derives an output that is fed to nonlinear controller 19 which forms the basis for the present invention.

Nonlinear controller 19 responds to the magnitude of the sampled error signal to derive a control signal on lead 21. The control signal has a gamut of different values that continuously vary as a nonlinear, monotomic function over a predetermined range, i.e., within assigned limits, of the sampled error signals. The range of error signals can be considered as somewhat similar to a deadband of a normal deadband type feedback controller of the prior art. The magnitude of each of the different values within the range is less than the magnitude of the error signal except when the error signal is equal to zero, at which time the error signal and the control signal are both zero. Outside of the range, the nonlinear controller 19 is activated so that the magnitude of the control signal on lead 21 is linearly related to the magnitude of the error signal derived from sampler 18.

In the preferred embodiment, the magnitude of the error signal on lead 21 is directly proportional to the square of the error signal derived from sampler 18 and has a polarity that is the same as the output error signal of the sampler. The linear proportionality constant is preferably set equal to approximately $1/6\sigma$, where $\sigma$ is the standard deviation of the output signal of moisture gauge 14. The value of $\sigma$ can be determined on a predetermined basis and is therefore generally an approximation of the standard deviation of the moisture or other output parameter being controlled.

To provide the described nonlinear response on lead 21, network 19 includes an absolute value circuit 22 connected to be responsive to the output signal of sampler 18. The absolute value circuit 22 derives a signal having a magnitude equal to the magnitude of the signal derived from sampler 18. The polarity of the output signal of absolute value network 22, however, is always the same, e.g. positive. The output signal of absolute value circuit 22 is combined in multiplier 23 with a signal derived from source 20 and having a magnitude equal to the predetermined quantity $1/6\sigma$. Multiplier 23 thereby derives an output signal having a magnitude equal to the magnitude of the error signal multiplied by $1/6\sigma$.

In response to the error signal being of relatively small value, within the assigned limits, network 19 functions in a non-linear manner. If, however, the error signal has a relatively large magnitude, network 19 is activated so that it enables the feedback loop to function in a linear manner. To these ends, the output signal of multiplier 23 is supplied to comparator 24, having a second input signal responsive to source 25. Source 25 derives a constant magnitude signal having a value indicative of a signal magnitude of plus one for the output of multiplier 23. Comparator 24 responds to the output signals of multiplier 23 and source 25 to actuate double pole single throw switch 26, that includes an armature 30 which selectively connects contacts 27 and 29 to output lead 28. In response to the magnitude of the output signal of multiplier 23 being less than or equal to one, comparator 24 activates switch 26 whereby the output signal of multiplier 23 which is supplied to contact 29 is fed to output lead 28 by armature 30. In the alternative, in response to the output signal magnitude of multiplier 23 exceeding a magnitude of one, comparator 24 activates switch 26 whereby the switch is energized to engage contact 27. Supplied to contact 27 is a signal magnitude equal to plus one, as derived from source 25. A signal having a value of plus one is thereby coupled to output lead 28 in response to the comparator 24 indicating that the assigned limit has been exceeded. Hence, the signal derived on lead 28 has a magnitude linearly proportional to the magnitude of the error signal for values of the error signal that fall within the assigned limits. However, for values of the error signal that fall outside of the assigned limits, the magnitude of the signal supplied to lead 28 is a constant, equal to plus one.

The signal on lead 28 is supplied as one input to multiplier 32, having a second input responsive to the error signal derived from sampler 18. Multiplier 32 responds to the output signal of sampler 18 and the signal on lead 28 to derive the control signal on lead 21. As illustrated in FIG. 2, wherein the control signal amplitude is plotted as a function of error signal, the control signal on lead 21 has: (1) a value directly proportional to the square of the error signal within the assigned limits, as indicated by mirror image square law line segments 33 and 34 on opposite sides of a zero error signal, and (2) a value directly proportional to the error signal value outside of the assigned limits, as indicated by mirror image straight line segments 35 and 36 that have the same slope and respectively intersect segments 33 and 34 at the error values of $+6\sigma$ and $-6\sigma$, which form boundaries for the assigned limits; at the assigned limits the control and error signal magnitudes are both equal to $6\sigma$. Line segments 35 and 36, if projected into the region wherein the error signal magnitude is less than $6\sigma$, would form a continuous straight line intersecting the origin of the FIG. 2 coordinate system. It is noted that the magnitudes of segments 33 and 34 between the assigned limits are less than those of corresponding points on the projected straight line and therefore the gain provided by network 19 between the assigned limits is less than the gain of a conventional linear controller, thereby reducing the amount of noise derived from profile average computer 15 compared to a linear controller. However, some finite gain is provided between the assigned limits so that the response of dryer 12, as reflected in the output of gauge 14, is not retarded, as in a normal deadband controller wherein gain is zero throughout the assigned limits.

The nonlinear controller 19 can also be thought of as a device having a variable gain proportional to error signal magnitude between the assigned limits and fixed gain outside of the assigned limits. FIG. 3, wherein gain of network 19 is plotted as a function of the error signal magnitude, assists in visualizing this concept of the nonlinear controller 19. For error signal magnitudes less than $6\sigma$, i.e., error signals within the assigned limits, the gain of network 19 linearly increases with a slope of $1/6\sigma$, as indicated by the upward sloping straight line segments 36 and 37 which originate at the origin of the FIG. 3 coordinate system. As the error signal approaches zero, the gain of network 19 approaches zero to provide limited deadband like response and therefore minimize noise. However, since the gain never reaches zero for a finite, non-zero error, continuous correction is provided over the entire range between the assigned limits and transient response problems of deadband controllers are substantially avoided. At the assigned limits of $6\sigma$, the gain of network 19 undergoes an abrupt transition and becomes constant, at a value equal to plus one, as indicated by the horizontal straight line segments 38 and 39.

The values of $\pm 6\sigma$ for the assigned limits were selected as a result of investigations I have conducted and which indicate that $\pm 6\sigma$ provides an effective compromise between transient response of the system and noise reduction. If the deadband is greater than $\pm 6\sigma$, the system transient response has a tendency to be retarded. For deadbands less than $\pm 6\sigma$, there is a reduction in the amount of noise removed by the system and the system operates more similarly to a conventional linear feedback controller. However, it is to be understood that other values for the assigned limits can be provided, depending upon the requirements of each individual system.

The output signal of network 19 on lead 21 is employed to derive a setpoint signal for controlling the average position of valve 11 during a scan of gauge 14. To this end, the signal on lead 21, which is derived once for a short time interval after each scan as a result of sampling by circuit 18, is supplied to a conventional integral controller 41 that derives an output signal magnitude that remains constant for one scan of motor 14, until the next signal is derived on lead 21. The setpoint signal derived from integral controller 41 is supplied as a supervisory, steam pressure setpoint input signal to a conventional analog steam pressure controller 42. Steam pressure controller 42 is also responsive to an electrical input signal indicative of the pressure within dryer 12, as derived by pressure transducer 43. Controller 42 responds to the output signals of controller 41 and transducer 43 to derive a pneumatic signal to control the position of valve 11. The pneumatic signal supplied by controller 42 to valve 11 is responsive to a comparison of the setpoint signal derived from controller 41 and transducer 43 to control the amount of steam fed to dryer 12 from source 44, whereby the steam pressure in dryer 12 is maintained at a value determined by controller 41. Random uncontrollable variations in the steam pressure are reduced as a result of the present invention because of the non-linear nature of network 19, but the steam pressure is controlled as a function of the error signal magnitude for all values of the error.

While one embodiment has been described and illustrated, it will be clear that variations in the details of the embodiment specifically illustrated and described may be made without departing from the true spirit and scope of the invention as defined in the appended claims. While the principles of the invention have been described in conjunction with a sampled analog type controller, it is to be understood that the invention is equally applicable to digital type controllers and can be performed by general or special purpose digital computer means. Also, the invention is applicable to sampling or digital controllers wherein control signals are intermittently applied directly to an actuator, as well as supervisory, set point control as specifically described in connection with FIG. 1.

I claim:

1. A system for controlling an output of an actuator, said output controlling a parameter to a setpoint value, comprising a feedback loop having an input responsive to a first signal indicative of the magnitude of the controlled parameter, said feedback loop including means for deriving an error signal indicative of the polarity and magnitude of the deviation of the first signal from the setpoint value, means responsive to the error signal for deriving a control signal having a magnitude that is a nonlinear continuous function of the deviation indicated by the error signal magnitude and has a polarity determined by the error signal indication of the polarity deviation, said control signal having a magnitude less than the magnitude indicated by the error signal for all error signal magnitudes indicative of the magnitude of the deviation being less than an assigned limit value except in response to the indicated deviation being equal to zero at which the control signal is zero, and means for energizing the actuator in response to the control signal, whereby noise normally introduced by the feedback means on the controlled parameter is substantially reduced by the nonlinear function, said control signal deriving means including means for maintaining the control signal a linearly increasing function of the deviation indicated by the error signal magnitude, instead of the nonlinear function, for error signal magnitudes indicating that the deviation is greater than the assigned limit value, said control signal deriving means including means for deriving the control signal with a magnitude directly proportional to the square of the deviation indicated by the error signal within the deadband.

2. A system for controlling an output of an actuator, said output controlling a parameter to a setpoint value, comprising a feedback loop having an input responsive to a first signal indicative of the magnitude of the controlled parameter, said feedback loop including means for deriving an error signal having a value indicative of the polarity and magnitude of the first signal relative to a setpoint value, said error signal having a magnitude directly proportional to the difference between the first signal and the setpoint value, means responsive to the error signal for deriving a control signal having a magnitude that is a nonlinear continuous function of the error signal magnitude and a polarity determined by the error signal polarity, said control signal monotonically increasing in magnitude for all magnitudes of the error signal less than an assigned limit value, said control signal having a magnitude less than the error signal magnitude for all error signal magnitudes less than the assigned limit value except in response to the error signal value being equal to zero wherein the control signal magnitude equals zero, and means for energizing the actuator in response to the control signal, whereby noise normally introduced by the feedback means on the controlled parameter is substantially reduced by the nonlinear function, wherein the said control signal deriving means includes means for maintaining the control signal as a linear, increasing function of the error signal magnitude, instead of the nonlinear function, for error signal magnitudes greater than the assigned limit value, said control signal deriving means including means for deriving the control signal with a magnitude directly proportional to the square of the error signal magnitude within the assigned limit value of the error signal values.

3. The system of claim 2 wherein the assigned limit value has a magnitude of approximately $6\sigma$, where $\sigma$ is approximately the standard deviation of the controlled parameter, and wherein the control signal has a magnitude of $6\sigma$ at the assigned limit values.

4. A system for controlling an output of an actuator, said output controlling a parameter to a setpoint value, comprising a feedback loop having an input responsive to a first signal indicative of the magnitude of the controlled parameter, said feedback loop including means for deriving an error signal having a value indicative of the polarity and magnitude of the first signal relative to a setpoint value, said error signal having a magnitude directly proportional to the difference between the first signal and the setpoint value, means responsive to the error signal for deriving a control signal having a magnitude that is a nonlinear continuous function of the error signal magnitude and a polarity determined by the error signal polarity, said control signal monotonically increasing in magnitude for all magnitudes of the error signal less than an assigned limit value, said control signal having a magnitude less than the error signal magnitude for all error signal magnitudes less than the assigned limit value except in response to the error signal value being equal to zero wherein the control signal magnitude equals zero, and means for energizing the actuator in response to the control signal, whereby noise normally introduced by the feedback means on the controlled parameter is substantially reduced by the nonlinear function, wherein the said control signal deriving means includes means for maintaining the control signal as a linear, increasing function of the error signal magnitude, instead of the nonlinear function, for error signal magnitudes greater than the assigned limit value, said assigned limit value has a magnitude of approximately $6\sigma$, where $\sigma$ is approximately the standard deviation of the controlled parameter, and wherein the control signal has a magnitude of $6\sigma$ at the assigned limit values.

* * * * *